United States Patent [19]

Fassbinder

[11] Patent Number: 5,641,720
[45] Date of Patent: Jun. 24, 1997

[54] CORUNDUM PORCELAIN COMPOSITION, PROCESSES FOR ITS PREPARATION AND USE

[75] Inventor: Gunter Fassbinder, Wunsiedel, Germany

[73] Assignee: Hoechst CeramTec Aktiengesellschaft, Selb, Germany

[21] Appl. No.: 564,451

[22] Filed: Nov. 29, 1995

[30] Foreign Application Priority Data

Nov. 29, 1994 [DE] Germany ............ 44 42 409.4

[51] Int. Cl.$^6$ ............................................. C04B 33/26
[52] U.S. Cl. .................. 501/141; 501/127; 501/143; 501/144
[58] Field of Search .................. 501/141, 143, 501/144, 128

[56] References Cited

U.S. PATENT DOCUMENTS

| | | | |
|---|---|---|---|
| 3,860,432 | 1/1975 | Higuchi et al. | 501/153 |
| 4,056,588 | 11/1977 | Baniel et al. | 264/63 |
| 4,717,695 | 1/1988 | Oda | 501/143 |
| 4,843,047 | 6/1989 | Oda et al. | 501/143 |
| 4,983,556 | 1/1991 | Seike et al. | 501/143 |
| 5,461,015 | 10/1995 | Kinsman et al. | 501/141 |

FOREIGN PATENT DOCUMENTS

| | | |
|---|---|---|
| 0 189 260 | 7/1986 | European Pat. Off. . |
| 0 281 420 | 9/1988 | European Pat. Off. . |
| 0 522 343 | 1/1993 | European Pat. Off. . |
| 113454 | 8/1900 | Germany . |
| 29 32 914 | 2/1981 | Germany . |
| 34 44 627 | 6/1986 | Germany . |

OTHER PUBLICATIONS

Batchelor et al., Some Physical Properties of Porcelain Bodies Containing Corundum, VII. Int. Ceram. Congr. London 1960, pp. 31–38. No month.

Dinsdale et al., Strength of Whiteware Bodies, Proc. Brit. Ceram. Soc. 1966, pp. 119–136. No month.

Roberts, Alumina in High Strength Porcelain Bodies, J. Canad. Ceram. Soc. 35, 1966, pp. 24–31. No month.

Schüller et al., Untersuchungen über die Gefügeausbildung im Porzellan, VII. Einfluss der Teilchengrösse bei Tonerdeporzellan. Berichte der Deutschen Keram. Ges. 47, 1970, pp. 478–484. No month.

Warshaw et al., Comparison of Strength of Triaxial Porcelains Containing Alumina and Silica, J. Amer. Cera. Soc. 50, 1967, pp. 337–343. No month.

Winogradow et al., Effect of the Modification and Grinding Fineness of Alumina on the Properties of High–Alumina Porcelain, Proc. 9th Conf. Silicate Ind. Budapest 1968, pp. 407–413. No month.

Derwent Publications Ltd., London, GB; AN 90–311404 & SU,A, 1 530 615 (Leningrad Lensovet Tech.) 23. Dec. 1989.

Derwent Publications Ltd., London, GB; An 91–013785 & SU,A, 1 544 751 (Geor. Poly.), 23. Feb. 1990.

*Primary Examiner*—Karl Group
*Attorney, Agent, or Firm*—Foley & Lardner

[57] ABSTRACT

A corundum porcelain composition containing from 60 to 94% by weight of a component A and from 6 to 40% by weight of a component B, wherein component A contains from 0 to 70% by weight of alumina, from 20 to 70% by weight of clay material, from 10 to 50% by weight of glass formers and from 0 to 30% by weight of quartz, and component B comprises comminuted broken porcelain, the chemical composition of the mixture of the components A and B comprises from 20 to 75% by weight of $SiO_2$, from 15 to 80% by weight of $Al_2O_3$ and from 2 to 10% by weight of flux selected from the group consisting of $K_2O$, $Na_2O$, FeO, MgO, CaO, $Li_2O$; BaO, SrO, ZnO and fluoride, and the comminuted broken porcelain has a mean particle size between 25 and 800 µm, useful, for example, in sintered bodies, such as insulators.

19 Claims, No Drawings

CORUNDUM PORCELAIN COMPOSITION, PROCESSES FOR ITS PREPARATION AND USE

BACKGROUND OF THE INVENTION

1. Field of the Invention

The invention relates to corundum porcelain compositions containing a plurality of inorganic starting materials. The invention also relates to methods of preparing and using such composition.

2. Description of Related Art

The addition of small amounts of comminuted broken porcelain to porcelain compositions for producing tableware is known. In the production of porcelain tableware, the addition of milled and fired broken porcelain increases the shape stability of the shaped bodies during firing. Texture effects play virtually no role here.

While the porcelain tableware items have thin walls and a low weight, the components of technical ceramics, particularly high voltage insulators and pipes, can have a length up to about 6 meters or a weight of more than 1000 kg. Depending on their length, their compactness and their weight, considerable stresses can arise in the shaped body and in the sintered body during shaping, drying, and firing. In the production of high voltage insulators, these stresses can lead to the sheds breaking off during drying of insulator bodies and to fracture of the shank during suspended firing. In use, high voltage insulators are subjected to not only considerable electrical stresses, but also mechanical stresses. The mechanical properties of the high voltage insulators, therefore, play a critical role. In the case of tubes of great length, the shape stability of the sintered body is important in use.

The production of high voltage insulators comprises preparing a plastic corundum porcelain composition, extruding a cylindrical body using a vacuum extruder, turning, drying, and firing. Extrusion produces textures in the green bodies. Texture means the anisotropic alignment of the platelet-like clay particles and the other constituents of the composition which results from the action of pressing pressure, flow, and shear.

Distinction can be made between flow texture, screw texture, and cutting texture. Particularly the cutting texture, which is produced by the flights of the screw of an extruder, is critical for insulator production. A thin zone of pronounced texture which runs helically through the shaped body is formed. This zone, which often extends over a large area, is a weak zone which can cause the shaped body fired in a hanging position to break during firing. The flow texture causes an anisotropic shrinkage on drying in the shaped body. Since the anisometric raw material particles are differently aligned in the outer and inner parts of the shaped body, this causes different shrinkage on drying. Drying results in stresses which in extreme cases in the drying of high voltage insulators can lead to the sheds breaking off from the shank of the shaped body.

To avoid textures which are too great, a corundum porcelain composition which is suitable for high voltage insulators should contain a proportion of relatively coarse particles. Up to 5% by weight of the raw materials are customarily added as coarse particles having a particle size distribution between about 45 and 100 µm, the coarse particles being composed of quartz, feldspar, and/or alumina agglomerates. Although commercial calcined aluminas have a significantly finer primary particle size, they are agglomerated as a result of the method of manufacture. The mean particle size of the corundum porcelain composition is then usually of the order of 8 µm.

As constituent of the fired porcelain, quartz has both a strength-increasing action and a strength- and lifetime-reducing action owing to the β-α-quartz transformation at 573° C. in the cooling phase of firing, which transformation is associated with a volume contraction of the quartz grains. The glass phase is already solidified at this temperature, resulting in microstructural stresses which increase with increasing quartz grain size. Tangential compressive stresses have a strength-increasing effect in the vicinity of a quartz grain; this microstructural stressing has to be overcome before crack propagation can occur. Strength and lifetime are impaired if the compensating radial tensile stresses exceed the strength of the quartz and generate microcracks in the quartz grains. Microcracks in quartz grains can frequently be observed in porcelains on optical microscopic examination. It is known that optimum strength is achieved with quartz grains having a size of the order of from 10 to 20 µm. However, raw materials able to be used on a large scale have such broad particle size distributions that proportions of relatively large, crack-prone quartz particles having a particle size up to about 80 µm are also always present if these raw materials are not milled in an additional process step to particle sizes of less than 20 µm for the entire particle size distribution.

Replacement of quartz by alumina (synthetic aluminum oxide and/or aluminum hydroxide powder) avoids the danger of microcrack formation since the corundum ($\alpha$-$Al_2O_3$) retained and/or formed during firing has a thermal expansion similar to that of the remaining micro-structural constituents of the corundum porcelain. Corundum is the constituent in corundum porcelain which has by far the best mechanical properties. The strength-increasing action of corundum is essentially dependent on its proportion and its grain size. It is generally known that the best strength is achieved when processing an alumina whose mean particle size after firing in the corundum porcelain is from about 3 to about 9 µm. For a corundum porcelain of high strength, such a fine alumina should be added or these particle sizes should be produced by milling during preparation of the composition; the quartz should be milled as finely as possible or avoided entirely. To be sure of excluding quartz particles >20 µm the mean particle size of the quartz should not exceed 3 µm. Even finer milling is advantageous.

Commercial feldspars too must not be added as a coarse fraction since they contain quartz as minor constituent and the feldspars, the alternatively usable feldspar substitutes or rocks containing feldspars and/or feldspar substitutes, which act as glass formers, have to be homogeneously distributed in the composition; these raw materials are, like milled broken glass and glass frits, referred to as glass formers in the following text.

The optimum strength can, therefore, only be achieved in conventional porcelain production if the starting materials are added in sufficiently fine form after prior milling or are finely milled during processing; the troublesome texture and the rejects resulting from this texture then have to be accepted. If this fine milling is omitted, an additional high proportion of the expensive alumina has to be added to achieve a sufficient strength.

In the large-scale manufacture of high voltage insulators, a substantial proportion of the rejects is caused by textures. Depending on the process procedure and insulator geometry, the rejects caused by texture are from about 1 to 3% of the components. Significant rejects resulting from textures also occur in the manufacture of other types of components from corundum porcelain. These effects are greater, the greater the degree to which shear forces occur during shaping and textures can be formed and the longer, compactor or heavier the shaped bodies are. Among the extremely varied shaping processes for ceramics, the ones which are most sensitive to the formation of textures are those which use compositions in a plastic state. These in particular include extrusion.

As indicated in the previous sections, in the production of large sintered bodies from conventional porcelain compositions a compromise has to be made according to the present state of the art between good behavior in production, particularly the reduction of textures, and high strength of the fired sintered bodies. The reduction in strength resulting from this compromise is occasionally counteracted by an additional high and expensive alumina addition, but a significant number of texture flaws nevertheless remain and these cannot be counteracted further.

EP-B-0 189 260 teaches a process for producing a high-strength, feldspar-type porcelain in which the nonplastic raw materials of the quartz, feldspar and alumina type have, corresponding to FIG. 1 of this EP document, a mean particle size of from about 2 to 4 µm, the nonplastic raw materials are calcined and subsequently mixed with the clay material. Since the calcination is carried out without clay material, no appreciable amount of mullite can be formed. There is, therefore, also an absence of the crystal nuclei which can allow a strong framework of mullite needles to be formed during firing and thus could increase the shape stability of the shaped body during firing. Before or after addition of the clay material, the calcined material is milled to a similar particle size to that possessed by the nonplastic raw materials prior to calcination. The milled mixture to which the clay material has been added is further processed by shaping, drying, and firing.

This document, therefore, teaches the repeated milling of the starting materials to an extraordinarily low particle size and the repeated carrying out of the firing. The fine-grained porcelain composition leads to a lower drying sensitivity. Owing to the fineness of this porcelain composition, it is expected that it tends to strong texture formation in the production of large bodies.

SUMMARY OF THE INVENTION

It is an object of the invention to provide a process for preparing a corundum porcelain composition in which the texture effects are kept so small that in the production of sintered bodies substantially no rejects occur as a result of the texture, and which requires no additional process steps in the production of a high-strength corundum porcelain.

It is a further object of the invention to use starting materials which are as inexpensive as possible in the preparation of the corundum porcelain composition.

It is also an object to provide corundum porcelain compositions having those desired characteristics and methods of using them in the formation of sintered bodies.

It is also an object of the invention, to provide sintered bodies, such as insulators, having improved characteristics.

In accordance with the present invention, these objects are achieved by a very simple and inexpensive-to prepare corundum porcelain composition which is particularly suitable for the mass production of high voltage insulators.

According to the invention, the corundum porcelain composition contains from 60% to 94% by weight of a component A and from 6% to 40% by weight of a component B, in each case based on the total weight of all inorganic starting materials in the dry state. In the composition, component A contains from 0 to 70% by weight of alumina, from 20 to 70% by weight of clay material, from 10 to 50% by weight of glass formers and from 0 to 30% by weight of quartz, in each case based on the total weight of the inorganic starting materials of the component A in the dry state, and component B comprises comminuted broken porcelain, the chemical composition of the mixture of the components A and B comprises from 20 to 75% by weight of $SiO_2$, from 15 to 80% by weight of $Al_2O_3$ and from 2 to 10% by weight of flux selected from the group consisting of $K_2O$, $Na_2O$, FeO, MgO, CaO, $Li_2O$, BaO, SrO, ZnO and fluoride, and the comminuted broken porcelain has a mean particle size between 25 and 800 µm, preferably between 32 and 250 µm, in particular between 42 and 150 µm.

In accordance with other aspects of the invention, there is provided a method of producing a sintered body from the above compositions, and sintered bodies so produced.

In accordance with further objects of the invention, there is provided a sintered body of corundum porcelain produced by shaping, drying, and firing a corundum porcelain composition containing comminuted broken porcelain, wherein the sintered body has a flexural strength which is at least 25 MPa higher than the flexural strength of a sintered body of corundum porcelain which is produced without addition of comminuted broken porcelain but with an essentially identical chemical composition and with the same or higher corundum content in the corundum porcelain, therein also providing powers of making and using the composition.

Further objects, features, and advantages of the invention will become apparent from the detailed description of the preferred embodiments that follows.

DETAILED DESCRIPTION OF PREFERRED EMBODIMENTS

The component A of the corundum porcelain composition of the invention preferably contains from 8 to 40% by weight of alumina, from 24 to 65% by weight of clay material, from 12 to 28% by weight of glass formers, and from about 0.2 to 25% by weight of quartz, in particular from 12 to 30% by weight of alumina, from 28 to 60% by weight of clay material, from 14 to 25% by weight of glass formers and from about 0.8 to 22% by weight of quartz.

The chemical composition of the mixture of the components A and B preferably comprises from 30 to 65% by weight of $SiO_2$, from 25 to 60% by weight of $Al_2O_3$ and from 2.5 to 8% by weight of flux, in particular from 42 to 55% by weight of $SiO_2$, from 35 to 55% by weight of $Al_2O_3$ and from 3 to 7% by weight of flux.

Preferably, in the corundum porcelain composition, the component A as mixture has a particle size distribution of from about 80 to 100% by weight less than 50 µm, in particular from 97 to 100% by weight less than 45 µm.

For the purposes of the present invention, the alumina used is generally an unmilled or milled raw material based on aluminum oxide, transition aluminas and/or aluminum hydroxide for which indicated percentages by weight are as $Al_2O_3$ alone. The fired alumina is here described as corundum. To also relate the term corundum porcelain to the raw materials added, it is advisable to add an amount of at least 1% of alumina. The term clay material denotes plastic raw materials based on clay and/or kaolin which, as is usual commercially, can be admixed with small amounts of other minerals and impurities. Glass formers is a term for the raw materials that contribute to glass formation, such as those based on feldspar, feldspar substitutes and/or rock having a high content of feldspar and/or feldspar substitutes and/or milled broken glass and/or glass frits. They act as fluxes and contribute substantially to formation of a glass phase during firing. The term quartz describes amorphous and crystalline raw materials based on $SiO_2$. In many cases quartz is present in some of the raw materials like clay material and/or feldspars as impurities in a content of at least 0.2 or even more than 0.8 % by weight. There is no need for an addition of quartz as separate raw material to create a higher strength, although a certain content of it may be added. The glass formers and quartz too can contain small amounts of other minerals and impurities. Quartz, glass formers and/or clay material can also be added in the form of naturally occurring mineral mixtures and rock.

The particle size and the particle size distribution of the coarser additives was determined by means of sieving above about 45 μm, while the laser granulometer Cilas 920 was used for measurements below 45 μm.

The comminuted broken porcelain can have a mean particle size greater than or equal to 25 μm, 50 μm, 60 μm, 80 μm, 100 μm, or 120 μm and less than 800 μm. On addition to the corundum porcelain composition, it already has a porcelain microstructure containing, apart from the glass phase, mullite and possibly corundum and/or quartz. The amounts of comminuted broken porcelain can no longer be discerned in the microstructure after firing. Preference is given to adding comminuted broken porcelain originating from the production of corundum porcelain. In the production of high voltage insulators, this is preferably the scrap from high voltage insulator manufacture. This can be the comminuted offcuts from the end regions of the insulator bodies which are removed before fitting the metal caps, and damaged and/or faulty insulators. Tubes and other technical ceramic products frequently also comprise corundum porcelain whose scrap can be preferably used for the preparation process of the invention.

Fired scrap from conventionally manufactured insulators frequently contains quartz grains up to 50 μm and corundum agglomerates up to 70 μm in size in the microstructure. Since the quartz grains are usually already damaged by microcracks and the corundum agglomerates have a porous and inhomogeneous structure, these are greatly reduced in size during comminution, processing and firing, since they have weak points. In the corundum porcelain of the invention, the oversize quartz grains and corundum agglomerates from the comminuted porcelain reach sizes which very seldom or never exceed 20 μm, even if the size of the comminuted broken porcelain particles exceeds 100 μm or even 500 μm.

The invention is accordingly based on the idea of breaking the texture formed during shaping by means of a coarse particle fraction in the corundum porcelain composition, which coarse fraction on firing leaves no quartz and corundum grains which impair the strength and lifetime of the sintered bodies of corundum porcelain as a result of the grain size or initial cracks in the grains.

Among the raw materials of the component A, alumina preferably has a particle size distribution of from 50 to 100% by volume at from 2 to 10 μm, quartz from 50 to 100% by volume $\leq$10 μm and glass formers from 50 to 100% by volume $\leq$10 μm.

The component B is generally added with a particle size $\leq$2000 μm, preferably a particle size $\leq$500 μm, in particular a particle size $\leq$200 μm. As the particle size distribution may be very broad such a particle size distribution with a mean particle size e.g. of 600 μm may show singular particles much about 2000 μm. They are preferably added to the mixture in a particle size distribution of from 70 to 95% by weight at from 30 to 400 μm, in particular a particle size distribution of from 70 to 95% by weight at from 30 to 150 μm. The mean particle size of the component B is preferably from twice to ten times as large as the mean particle size of the component A. The corundum porcelain composition preferably contains from 12 to 36% by weight of the component B, in particular from 18 to 32% by weight.

The compositions of the invention may be produced in any desired manner. A preferred process for preparing corundum porcelain compositions comprises mixing together the starting materials of the component A and, if appropriate, also milling the mixture, with the mixture having a particle size distribution of from 97 to 100% by weight less than 45 μm, and then mixing the component B into the component A.

A further process for preparing corundum porcelain compositions according to the invention comprises producing a mixture of the inorganic starting materials of the component A to which a part of the inorganic starting materials, in particular a part amount or the entire amount of clay material, is not added, homogenizing this mixture and, if appropriate, also milling it and subsequently adding the missing parts of the inorganic starting materials and the component B to this mixture. In a preferred variant of this process, the parts of the inorganic starting materials missing from the mixture are combined with the component B, homogenized and, if appropriate, also milled, before this second mixture is added to the mixture of the other inorganic starting materials of the component A. In a particularly advantageous process variant, the part amount of clay material missing from the mixture is $\geq$50% by weight, in particular 80% to 95% by weight, of the total amount of clay material added.

In preferred processes, the total mixture of the components A and B is homogenized and, if appropriate, also milled. The homogenization of a mixture or the total mixture of the components A and B can be carried out in a mixer, but preferably by milling. In these process variants, the total mixture is particularly preferably milled to a particle size distribution of from 80 to 98% by weight less than 45 μm.

Those skilled in the art are familiar with the various techniques of comminution and preparation of the composition for the purposes of porcelain production as well as the specific raw material grades to be used here. Any preparation process which ensures that either the prepared corundum porcelain composition or the body fired from a corundum porcelain composition is free of quartz grains >20 μm is preferred.

Wet preparation processes in which an amount of water of the order of 50% by weight is present in the composition prior to dewatering carried out in a filter press are preferable owing to the good homogenization. The individual additions can be homogenized and/or milled individually, in groups, or in the entire mixture. The clay material can be added at any stage of the preparation; when wet milling is used, it is advantageous to mix at most 20% by weight of the total amount of clay material to be added into the nonplastic raw materials, so as to achieve a more intensive milling action. It can be sufficient to homogenize the components A and B purely by a mixing procedure, e.g., in a blunger; in many cases it is more favorable to also mill this mixture. If greater homogenization of the components A and B is to be achieved, it is advisable to add the component B essentially in a particle size >30 μm and to carry out stronger milling, e.g., to a particle size distribution of from 80 to 98% by weight less than 45 μm.

The comminuted broken porcelain introduces mullite into the corundum porcelain composition. This mullite has the effect of crystallization nuclei, so that the crystallization of mullite from the glass phase commences earlier and more intensively. This results in the formation of more mullite needles than in conventional porcelain, so that the viscosity of the melt phase appears to be increased owing to fixing, e.g., via the interwoven mullite crystals, and the deformation stability during firing is improved. Owing to the addition of comminuted broken porcelain, very fine milling of the raw materials is not necessary for producing a particularly mullite-rich corundum porcelain. In a conventional preparation process, the very fine milling would increase the reactivity of the raw materials and promote the formation of mullite, but would also increase the texture sensitivity of the composition so much that it is not usable for insulator manufacture. In addition, the very finely milled composition is difficult to process, particularly in shaping.

The increase in the mullite content was able to be confirmed by X-ray diffraction. With the apparently increased viscosity of the melt phase resulting from the mullite, the strength of the shaped bodies during firing also increases. This makes it possible to produce larger and heavier insulators, but also those having smaller diameters and greater length. If the insulator bodies are fired standing up, the improved shape stability creates firing space in the furnace because the parts used for suspension are omitted or can at least be made smaller.

The oversize quartz particles of the comminuted broken porcelain also become smaller under the mechanical stressing during the preparation of the composition, since the microcracks in large quartz grains aid comminution by acting as preferential points of fracture. During firing, the quartz grains are partly dissolved in the melt phase. The strength and lifetime of the sintered bodies produced therefrom are not impaired.

The preparation of the corundum porcelain composition of the invention not only avoids repeated firing and repeated milling, but also saves a part of the high-cost raw materials, in particular alumina, by addition of comminuted broken porcelain. In addition, a higher strength of the corundum porcelain of the invention is achieved without having to additionally add higher amounts of alumina, since the corundum particles present in the comminuted broken porcelain have a fully strength-increasing action.

It has surprisingly been found that a sintered body of corundum porcelain according to the invention which is produced by shaping, drying, firing and, if desired, further process steps from a corundum porcelain composition containing comminuted broken porcelain has a flexural strength which is at least 25 MPa higher than the flexural strength of a sintered body of corundum porcelain which is produced without addition of comminuted broken porcelain but has essentially the same chemical composition and the same or higher corundum content in the corundum porcelain. The deformation of shaped bodies under their own weight during firing is significantly decreased; this additionally opens up the opportunity of producing even larger or longer insulators having a greater load per unit area and of firing them in a suspended position.

Surprisingly, the addition of comminuted broken porcelain containing oversize quartz and corundum particles resulted in strong size reduction and dissolution of these particles during firing, so that these particles do not impair the strength and lifetime of the sintered bodies produced therefrom.

The corundum porcelain composition of the invention, can be advantageously used, inter alia, for the production of insulators, tubes, rods, catalyst supports, laboratory porcelain, porcelain sanitaryware, and porcelain tableware and is particularly suitable for high voltage insulators.

EXAMPLES

The invention is illustrated below by means of the examples according to the invention and is compared with the comparative examples. The examples are for illustrative purposes only and do not limit the invention.

In all comparative examples and examples according to the invention the corundum porcelain composition was prepared by milling in a ball mill at a water content of about 50% by weight and subsequent pressing to a water content of about 20% by weight in a filter press. The shaping of the test specimens in the form of round rods was carried out using a vacuum extruder model V 250 from Netzsch and, for the production of high voltage insulators, using a vacuum extruder of appropriate dimensions. Firing was carried out in a car bottom furnace using a firing curve as is conventionally used for high voltage insulators. The firing temperature reached about 1320° C.

The flexural strength was tested after firing on unglazed and unground round rods having a diameter of 12 mm and a span of 100 mm in a 3-point flexural testing apparatus in accordance with IEC 672. The round rods were made from the respective corundum porcelain composition by extrusion to at diameter such that shrinkage during drying and firing resulted in a diameter of 12±0.1 mm. Measurements on from 10 to 12 specimens were averaged in each case.

For testing the deformation during firing, unglazed bars having a trapezoidal cross section of 23 mm×21 mm×14 mm height and a length of 250 mm were used. They were extruded using a separate die and mounted during firing on two knife-edges of refractory material 190 mm apart. The deflection of the middle of the bar from the plane of the knife-edges was measured. A small amount of sag is a measure of high deformation stability during firing.

For the examination of the microstructure of the fired corundum porcelain, polished sections were prepared and these were evaluated using a reflected-light microscope.

Example 1 (Comparative Example)

For the comparative example 1 and the example 2 according to the invention, two batches were made up in such a way that the corundum porcelain compositions had essentially identical chemical analyses, but different mineralogical compositions. The chemical analysis was (figures in % by weight):

|  | Comparative Example 1 | Example 2 |
| --- | --- | --- |
| $SiO_2$ | 46.91 | 46.74 |
| $Al_2O_3$ | 42.29 | 42.30 |
| $Fe_2O_3$ | 0.55 | 0.66 |
| $TiO_2$ | 0.23 | 0.27 |
| CaO | 0.21 | 0.25 |
| MgO | 0.43 | 0.52 |
| BaO | 0.07 | 0.06 |
| $K_2O$ | 4.24 | 4.18 |

-continued

|  | Comparative Example 1 | Example 2 |
|---|---|---|
| $Na_2O$ | 0.39 | 0.40 |
| Loss on ignition | 4.58 | 4.52 |

The batch of the comparative example 1 corresponded to a conventional corundum porcelain composition also used for high voltage insulators and consisted of 25% by weight of alumina, added as aluminum oxide, 8% by weight of quartz, 40% by weight of clay material and 27% by weight of feldspar. The mixture of these raw materials was milled for 2.5 hours in a ball mill and given a particle size distribution in which 95% by weight of the milled material is less than 45 µm, as measured by sieving. The flexural strength of the corundum porcelain produced therefrom was 120 MPa. The microstructure of the comparative example 1 showed quartz grains up to 70 µm, corundum grains in agglomerates up to 90 µm and pore sizes up to 60 µm.

Example 2 (According to the Invention)

For the component A, 17% by weight of alumina as aluminum oxide, 3% by weight of quartz, 40% by weight of clay material and 20% by weight of feldspar were mixed and milled to a particle size distribution of 99.8% by weight <45 µm using a ball mill. 20% by weight of comminuted broken porcelain having a particle size distribution essentially between 45 and 100 µm was then added as component B and the mixture was homogenized by milling for 0.5 hours in a ball mill. This likewise gave a particle size distribution of 95% by weight <45 µm. The comminuted broken porcelain had a corundum content of 25% by weight, so that the alumina and corundum content of the batch was 22% by weight.

In the example 2 according to the invention, a flexural strength of 155 MPa was determined; a 35 MPa higher flexural strength was thus achieved, although the corundum content of the sintered bodies was 3% by weight less than in the case of the sintered bodies of the comparative example 1.

The microstructure of the corundum porcelain of the invention was, examined under the reflected-light microscope, significantly finer and more homogeneous than in the comparative example 1. 99.9% of the corundum grains were smaller than 30 µm and 99.9% of the quartz grains did not exceed 2 µm. The pore size was measured as 99.9% ≦35 µm.

X-ray diffraction patterns recorded using a diffractometer showed the mullite content in the corundum porcelain of example 2 to be 1.6 times that in comparative example 1. Quartz could not be detected in the corundum porcelain of example 2, while the corundum porcelain of comparative example 1 showed a very distinct quartz peak.

Comparative Example 3 and Examples 4 to 7
According to the Invention

In the examples 3 to 7, the amount of comminuted broken porcelain added was varied, but the total content of alumina and of corundum from the comminuted broken porcelain was kept constant at 20% by weight of $Al_2O_3$ in the corundum porcelain body. The component A used was a mixture of alumina, feldspar, quartz, kaolin, and clay. Table 1 shows the added amounts of inorganic starting materials of the component A and the added amount of the component B. The sum of the individual added amounts is in each case 100% by weight based on the total weight of all inorganic starting materials in the dry state. Table 2 shows the amounts of alumina and corundum added to the corundum porcelain body. The preparation of comparative example 3 was carried out as in comparative example 1. The mixture of the comparative example 3 was milled to a particle size distribution of 95.5% by weight <45 µm. The comminuted broken porcelain had the following composition: $SiO_2$ 49.2% by weight; $Al_2O_3$ 44.5% by weight; $Fe_{2O3}$ 0.5% by weight; $TiO_2$ 0.2% by weight; CaO 0.2% by weight; MgO 0.5% by weight; $K_2O$ 4.5% by weight; $Na_2O$ 0.4% by weight.

The preparation of the examples 4 to 7 according to the invention was carried out as in the example 2 according to the invention. Here, the component A was milled to particle size distributions of from 99.6 to 100% by weight <45 µm. The particle size distributions of the comminuted broken porcelain were essentially between 45 and 100 µm. The millings of the total mixture gave particle size distributions of from 95 to 96% by weight <45 µm. The results of the flexural strength and sag tests for the corundum porcelain produced therefrom are likewise reproduced in Table 2.

TABLE 1 amounts of inorganic starting materials of the component A and amount of the component B added to the corundum porcelain compositions of the examples and comparative examples

| | Component B | Component A | | | | |
|---|---|---|---|---|---|---|
| Example, comparative example | comminuted broken porcelain % by weight | Alumina % by weight of $Al_2O_3$ | Feldspar % by weight | Quartz % by weight | Kaolin % by weight | Clay % by weight |
| CE 1 | 0 | 25 | 27 | 8 | 30 | 10 |
| E 2 | 20 | 17 | 20 | 3 | 30 | 10 |
| CE 3 | 0 | 20 | 28 | 12 | 30 | 10 |
| E 4 | 8 | 18 | 25 | 9 | 30 | 10 |
| E 5 | 16 | 16 | 22 | 6 | 30 | 10 |
| E 6 | 24 | 14 | 19 | 3 | 30 | 10 |
| E 7 | 32 | 12 | 16 | 0 | 30 | 10 |
| E 8 | 20 | 12 | 20 | 8 | 30 | 10 |
| E 9 | 20 | 15 | 20 | 5 | 30 | 10 |
| E 10 | 20 | 18 | 20 | 2 | 30 | 10 |
| E 11 | 20 | 21 | 19 | 0 | 30 | 10 |
| CE 12 | 0 | 25 | 27 | 8 | 30 | 10 |
| CE 13 | 0 | 29 | 25 | 6 | 30 | 10 |

TABLE 1-continued amounts of inorganic starting materials of the component A and amount of the component B added to the corundum porcelain compositions of the examples and comparative examples

| Example, comparative example | Component B comminuted broken porcelain % by weight | Component A Alumina % by weight of $Al_2O_3$ | Feldspar % by weight | Quartz % by weight | Kaolin % by weight | Clay % by weight |
| --- | --- | --- | --- | --- | --- | --- |
| CE 14 | 0 | 33 | 23 | 4 | 30 | 10 |
| CE 15 | 0 | 37 | 21 | 2 | 30 | 10 |
| CE 16 | 0 | 41 | 19 | 0 | 30 | 10 |

TABLE 2

Amounts of corundum and alumina added to the corundum porcelain composition and material properties of the corundum porcelain product therefrom

| Example, comparative example | Addition of broken porcelain having a corundum content of 25% by weight % by weight | Alumina addition % by weight | Total content of alumina and corundum % by weight | Flexural strength MPa | Sag mm |
| --- | --- | --- | --- | --- | --- |
| CE 1 | 0 | 25 | 25 | 120 | n.d. |
| E 2 | 20 | 17 | 22 | 155 | n.d. |
| CE 3 | 0 | 20 | 20 | 113 | 19 |
| E 4 | 8 | 18 | 20 | 129 | 20 |
| E 5 | 16 | 16 | 20 | 139 | 15 |
| E 6 | 24 | 14 | 20 | 141 | 12 |
| E 7 | 32 | 12 | 20 | 165 | 10 |
| E 8 | 20 | 12 | 17 | 138 | 15 |
| E 9 | 20 | 15 | 20 | 144 | 14 |
| E 10 | 20 | 18 | 23 | 157 | 13 |
| E 11 | 20 | 21 | 26 | 173 | 12 |
| CE 12 | 0 | 25 | 25 | 118 | 17 |
| CE 13 | 0 | 29 | 29 | 134 | 21 |
| CE 14 | 0 | 33 | 33 | 142 | 18 |
| CE 15 | 0 | 37 | 37 | 150 | 19 |
| CE 16 | 0 | 41 | 41 | 163 | 16 |

The test results on the specimens of examples 3 to 7 clearly show the strong rise of the flexural strength and the deformation stability during firing with increasing added amount of comminuted broken porcelain, although the content of alumina in the form of aluminum oxide and of corundum in the total mixtures was kept constant at 20% by weight.

Examples 8 to 11 According to the Invention and Comparative Examples 12 to 16

In the examples 8 to 11 according to the invention, the content of alumina and corundum in the corundum porcelain composition was varied, with the amount of comminuted broken porcelain added being left unchanged at 20% by weight. The component A used as a basis contained 30% by weight of kaolin, 10% by weight of clay and varying contents of alumina, feldspar and quartz (Table 1). The preparation was carried out as in example 2. The component A was milled to particle size distributions of from 99.6 to 100% by weight <45 μm. The particle size distributions of the component B were essentially between 45 and 100 μm. The total mixtures were milled in a ball mill to particle size distributions of from 95 to 96% by weight <45 μm and were thereby thoroughly homogenized. The contents of alumina and corundum and also the test results are shown in Table 2. The comminuted broken porcelain had the same composition as in examples 4 to 7. The example 8 according to the invention was fabricated on a relatively large experimental scale; this resulted in neither processing difficulties nor texture rejects.

The preparation of the corundum porcelain compositions of the comparative examples 12 to 16 was carried out in a similar manner to that for a conventional corundum porcelain. The inorganic starting materials including the clay but excluding the kaolin were milled in a ball mill. The total kaolin content was added in a blunger to the mixture milled in the ball mill. Here, particle size distributions of from 95 to 96% by weight <45 μm were set. The major part of the water was subsequently removed from these total mixtures in a filter press. To achieve a flexural strength as in the examples 8 to 11 according to the invention, significantly higher contents of $Al_2O_3$ added in the form of alumina are required (Table 2). The flexural strength of the comparative examples 12 to 16 is, based on the respective corundum content of the corundum porcelain, at a significantly different strength level which, for a comparable composition, is as much as 35 or more MPa below the comparable values of the examples 8 to 11 according to the invention. The sag is about one third higher compared with the examples 8 to 11 according to the invention and, therefore, worse.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention.

What is claimed is:

1. A corundum porcelain composition comprising from 60 to 94% by weight of a component A and from 6 to 40% by weight of a component B, in each case based on the total weight of all inorganic starting materials in the dry state, wherein component A comprises from 0 to 70% by weight of alumina, from 20 to 70% by weight of clay material, from 10 to 50% by weight of glass formers, and from 0 to 30% by weight of quartz, in each case based on the total weight of the inorganic starting materials of the component A in the dry state, and component B comprises comminuted broken porcelain, wherein the chemical composition of the mixture of the components A and B comprises from 20 to 75% by weight of $SiO_2$, from 15 to 80% by weight of $Al_2O_3$, and from 2 to 10% by weight of flux selected from the group consisting of $K_2O$, $Na_2O$, FeO, MgO, CaO, $Li_2O$, BaO, SrO, ZnO, and fluoride, and wherein the comminuted broken porcelain has a mean particle size between 25 and 800 µm.

2. A corundum porcelain composition as claimed in claim 1, wherein component A contains from 8 to 40% by weight of alumina, from 24 to 65% by weight of clay material, from 12 to 28% by weight of glass formers and from 0.2 to 25% by weight of quartz, and wherein the chemical composition of the mixture of the components A and B comprises from 30 to 65% by weight of $SiO_2$, from 25 to 60% by weight of $Al_2O_3$, and from 2.5 to 8% by weight of flux, and the component A has, as a mixture, a particle size distribution of from 80 to 100% by weight less than 50 µm.

3. A corundum porcelain composition as claimed in claim 1, wherein component A contains from 12 to 30% by weight of alumina, from 28 to 60% by weight of clay material, from 14 to 25% by weight of glass formers and from 0.8 to 22% by weight of quartz, and wherein the chemical composition of the mixture of the components A and B comprises from 42 to 55% by weight of $SiO_2$, from 35 to 55% by weight of $Al_2O_3$ and from 3 to 7% by weight of flux, and component A has, as a mixture, a particle size distribution of from 97 to 100% by weight less than 45 µm.

4. A corundum porcelain composition as claimed in claim 1, wherein, for the raw materials of the component A, the alumina has a particle size distribution of 50–100% by volume from 2 to 10 µm, the quartz has a particle size distribution of from 50 to 100% by volume $\leq$10 µm and the glass formers have a particle size distribution of from 50 to 100% by volume $\leq$10 µm.

5. A corundum porcelain composition as claimed in claim 1, wherein the component B is added in a particle size of $\leq$2000 µm.

6. A corundum porcelain composition as claimed in claim 1, wherein the mean particle size of the component B is from twice to ten times as great as the mean particle size of the component A.

7. A corundum porcelain composition as claimed in claim 1, containing from 12 to 36% by weight of component B.

8. A process for preparing a corundum porcelain composition as claimed in claim 1, which comprises mixing together the starting materials of the component A and, optionally, also milling the mixture, with the mixture having a particle size distribution of from 97 to 100% by weight less than 45 µm, and then mixing the component B into the component A.

9. A process for preparing the corundum porcelain composition as claimed in claim 1, which comprises producing a mixture from the inorganic starting materials of the component A to which a part of the inorganic starting materials, is not added, homogenizing this mixture and, optionally, also milling it and adding the missing parts of the inorganic starting materials and the component B to this mixture.

10. A process for preparing the corundum porcelain composition as claimed in claim 9, wherein the parts of the inorganic starting materials missing from the mixture and the component B are combined, homogenized and, optionally, also milled before this second mixture is added to the mixture of the other inorganic starting materials of the component A.

11. A process for preparing the corundum porcelain composition as claimed in claim 8, wherein the total mixture of the components A and B is homogenized and, optionally, also milled.

12. A process for preparing the corundum porcelain composition as claimed in claim 8, wherein the mixture of components A and B is milled to a particle size distribution of from 80 to 98% by weight less than 45 µm.

13. A method for making an insulator, tube, rod, catalyst support, laboratory porcelain, porcelain sanitaryware, or porcelain tableware, comprising shaping, drying, and firing a corundum porcelain composition as claimed in claim 1.

14. A method for making a sintered body of corundum porcelain, comprising shaping, drying and firing a corundum porcelain composition containing comminuted broken porcelain, wherein the corundum porcelain composition comprises a corundum porcelain composition comprising from 60 to 94% by weight of a component A and from 6 to 40% by weight of a component B, in each case based on the total weight of all inorganic starting materials in the dry state, wherein component A comprises from 0 to 70% by weight of alumina, from 20 to 70% by weight of clay material, from 10 to 50% by weight of glass formers and from 0 to 30% by weight of quartz, in each case based on the total weight of the inorganic starting materials of the component A in the dry state, and component B comprises comminuted broken porcelain, wherein the chemical composition of the mixture of the components A and B comprises from 20 to 75% by weight of $SiO_2$, from 15 to 80% by weight of $Al_2O_3$ and from 2 to 10% by weight of flux selected from the group consisting of $K_2O$, $Na_2O$, FeO, MgO, CaO, $Li_2O$, BaO, SrO, ZnO, and fluoride, and wherein the comminuted broken porcelain has a mean particle size between 25 and 800 µm.

15. A method of claim 14, wherein the sintered body is free of quartz grains having a size of greater than 20 µm.

16. A method of claim 14, wherein the sintered body is an insulator.

17. A method of producing a sintered body comprising shaping, drying, and firing a composition of claim 1.

18. A corundum porcelain composition as claimed in claim 1, wherein the glass former comprises feldspar and the clay comprise kaolin and another clay.

19. A corundum porcelain composition as claimed in claim 1, wherein the comminuted broken porcelain introduces mullite into the composition.

* * * * *